UNITED STATES PATENT OFFICE.

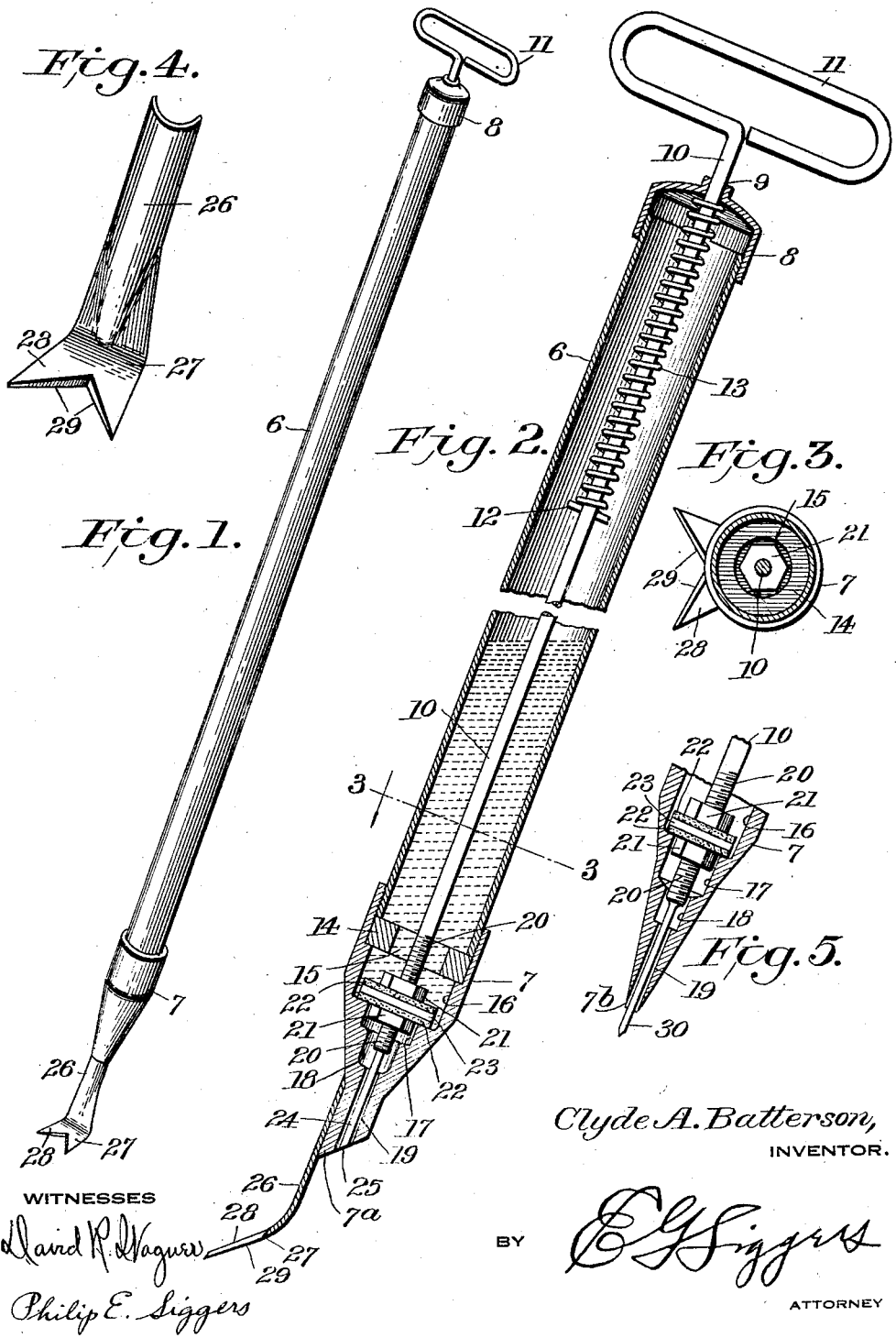

CLYDE A. BATTERSON, OF HASTINGS, NEBRASKA.

WEED EXTERMINATOR.

1,407,689.　　　　Specification of Letters Patent.　　Patented Feb. 28, 1922.

Application filed September 14, 1920. Serial No. 410,267.

*To all whom it may concern:*

Be it known that I, CLYDE A. BATTERSON, a citizen of the United States, residing at Hastings, in the county of Adams and State of Nebraska, have invented a new and useful Weed Exterminator, of which the following is a specification.

The present invention relates to implements for destroying weeds.

The general object of the invention is to provide a device which may be used not only to cut the root of the weed but also one which will forcibly eject a measured quantity of poisonous liquid into said root to bring about certain death of the weed.

The device of the present invention is particularly designed to destroy dandelions which, as is well known, infest lawns the country over and are a great pest, as they detract greatly from the appearance of the lawns. The present implement is capable of being used for destroying insects, particularly those which make their home in the ground, such as ants.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 1 is a perspective view of the improved implement.

Fig. 2 is a longitudinal sectional view with some parts in elevation.

Fig. 3 is a cross section on the line 3—3 of Fig. 2.

Fig. 4 is a perspective view of the knife shown removed from the implement.

Fig. 5 is a longitudinal sectional view of the lower end of a slightly modified form of implement.

The numeral 6 denotes the cylinder or barrel, which forms the main body of the container for the liquid used to destroy the plants or insects. This liquid may be actually toxic in nature, or it may merely be an oil which suffocates or otherwise destroys the vermin. The cylinder or barrel 6 has a nozzle section 7 secured at the lower end thereof by screws threads, which nozzle section substantially closes the barrel at said end. The upper end of the barrel is closed by a screw-threaded cap 8 having an aperture 9 through which a rod 10 may slide.

The upper end of the rod 10 has a handle 11 so that it may be manually reciprocated within the barrel. A pin 12 traverses the rod 10 at any convenient point within the barrel, and a coil spring 13 is interposed between the pin 12 and the under side of the cap 8. The normal tendency of the spring 13 will be to expand and cause the rod 10 to move downwardly toward the nozzle section 7. The lower end of rod 10 is screw-threaded, as is indicated at 20, these screw threads being engaged by a pair of nuts 21 which provide means for holding in place a valve member. The valve member comprises a steel washer 23 flanked on either side by a leather, rubber or similar washer 22. The nuts 21 compress the flexible washers against the intermediate metallic washer so that the three washers together form a disk-like valve. Obviously, by loosening either of the nuts 21 and moving the same upwardly or downwardly in the barrel, as the case may be, it is possible to adjust the position of the valve member relative to the rod 10 so that the force with which the valve is pressed downwardly by the spring 13 may be regulated.

The lower end of the barrel 6 is partly closed by a disk 14. This disk has a central aperture 15 through which the rod 10 extends. When the rod is pulled upwardly, the upper washer 22 is pressed against the lower face of disk 14, while the upper nut 21 is received within the aperture 15 and thus allows perfect seating of the valve on the disk.

The nozzle section 7 has a bore 16 therein which is of sufficient diameter to freely receive the valve member. A counterbore 17 is also provided in the nozzle member, of sufficient diameter to receive the lower nut 21 when the valve is seated within the bore 16. A second counterbore 18 is further provided, and a discharge vent 19 leads off from the counterbore 18. The lower threaded end 20 of the rod 10 has an extension 24 freely reciprocable within the discharge vent 19 and providing means by which the rod 10 is guided at its lower end. There is sufficient space between the extension 24 and the walls of the discharge passage 19 to allow liquid to pass down to the lowermost extremity of the implement. Said extremity is beveled as indicated at 7ª, and the outer end of extension 24 is similarly beveled as indicated at 25.

The effect of the construction just described is that a given quantity of liquid is admitted into the valve chamber, comprehended between the disk 14 and the bottom of the bore 16, which quantity of liquid is cut off from the rest of the liquid in the barrel when the rod is pulled upwardly. Now, when the rod is released, under the action of the coil spring, the valve member is moved forcibly downwardly, whereupon the liquid is forced out through the successively decreasing passageways 17, 18 and 19, thus bringing about a large increase in the pressure to which the liquid is subjected. This causes the liquid to spurt out in a strong jet, thus preventing dissipation or wasting of the liquid and directing the same to the exact spot where it is desired to apply it.

The knife, as seen most clearly in Fig. 4, comprises a transversely curved shank 26 whose lower end is flattened and has an outwardly-bent flat section 27. The flat portion 27 of the knife carries a pair of prongs or blades 28 having edges 29. This forked knife is secured in any desirable way to the lower part of the nozzle section, and the beveled end 7ª has nearly the same inclination as the bent section 27 of the knife. Thus, the knife, when it is used to cut the root of a weed under the surface of the soil, is not hindered in its action by the nozzle section. The forked end of the knife contributes greatly to the ease with which it is used, since the root may be cut by the two converging knife edges 29.

In the modification of Fig. 5, no knife is employed, but instead the lower end of the rod 10 is continued into a piercing point 30 adapted to be driven into the heart of the plant so that the root is first pierced before the poisonous liquid is forced into the same. The nozzle end 7ᵇ, in this case, tapers uniformly to a point. Otherwise, the construction is the same as that described above.

What is claimed is:

1. In an implement of the class described, a barrel adapted to hold liquid, a disk at the lower end of the barrel and partly closing said end, a nozzle member enclosing said disk and said barrel end and holding the disk in position, said disk having a central aperture, a rod reciprocable within the barrel and having a valve fast thereto, said valve being seated on the lower face of the disk when the rod is pulled upwardly, a bore provided in the nozzle section and furnishing a second valve seat opposing the disk, a counterbore of reduced diameter leading off from the bore, a second counterbore leading off from the first counterbore and being of less diameter than the first counterbore, and a discharge vent connected with the lower end of the second counterbore, said rod having an extension beyond the valve, said extension being reciprocable within the discharge vent.

2. In an implement of the class described, a barrel, a nozzle section substantially closing the lower end of said barrel and having a reduced end, means contained within the barrel for dispensing liquid through the lower extremity of said nozzle section, said lower extremity being beveled, a knife having its shank secured to the outer wall of the reduced end of the nozzle section and extending longitudinally thereof so as to depend from the same, said knife having a bent flat cutting portion, said cutting portion extending below and being spaced from the beveled end of the nozzle section and having substantially the same angle as said beveled end and whereby it is substantially parallel thereto, the cutting portion having pointed knife-edged prongs, whereby the knife may be engaged with the root of the weed without forcing the nozzle into the earth.

In testimony, that I claim the foregoing as my own, I have hereto affixed my signature.

CLYDE A. BATTERSON.